(12) United States Patent
Otero

(10) Patent No.: US 6,267,441 B1
(45) Date of Patent: Jul. 31, 2001

(54) CHILD VEHICLE SAFETY SEAT

(76) Inventor: Armando Otero, 714 W. Virginia, Tampa, FL (US) 33603

( * ) Notice: Subject to any disclaimer, the term of this patent is extended or adjusted under 35 U.S.C. 154(b) by 0 days.

(21) Appl. No.: 08/406,586

(22) Filed: Mar. 20, 1995

(51) Int. Cl.$^7$ .................................................. A47C 1/08
(52) U.S. Cl. ................................. 297/254; 297/256.11
(58) Field of Search .................... 297/250.1, 252, 297/254–256, 256.11, 256.1

(56) References Cited

U.S. PATENT DOCUMENTS

| | | | | |
|---|---|---|---|---|
| 956,835 | * | 5/1910 | Taulman | 297/254 X |
| 1,049,080 | * | 12/1912 | Greene | 297/256 |
| 1,283,225 | * | 10/1918 | Lea | 297/254 X |
| 1,387,049 | * | 8/1921 | Gunderson | 297/254 |
| 1,688,225 | * | 10/1928 | Belohlzvek | 297/256 |
| 1,750,435 | * | 3/1930 | Silver | 297/254 |
| 2,008,689 | * | 7/1935 | Donahoe | 297/255 X |
| 2,473,312 | * | 6/1949 | Thompson | 297/254 |
| 3,023,047 | * | 2/1962 | Linden | 297/254 |
| 3,116,069 | * | 12/1963 | Dostal | 297/254 X |
| 3,157,432 | * | 11/1964 | Watkins | 297/254 |
| 3,271,784 | * | 9/1966 | Peffley | 297/254 |
| 3,645,548 | * | 2/1972 | Briner | 297/254 X |
| 4,215,900 | * | 8/1980 | Coult | 297/254 |

* cited by examiner

*Primary Examiner*—Milton Nelson, Jr.

(57) ABSTRACT

A method for securely mounting a child safety seat to an adult vehicle seat, and to a kit with which a conventional child safety seat can be retrofitted for more secure mounting to a vehicle seat. The child vehicle safety seat includes a seat portion and a backrest portion, and the vehicle seat includes a seat portion, a seatbelt, and a backrest portion. The method involves securing the base of the child vehicle safety seat using the seatbelt in a conventional manner, then further securing the backrest of the child vehicle safety seat against forward movement using a U-shaped bracket comprising a first arm and a second arm, wherein the first arm is bolted to the back of the child seatback, and wherein the second arm of the U-shaped bracket is adapted for mounting flush against the back of the vehicle seat backrest.

1 Claim, 2 Drawing Sheets

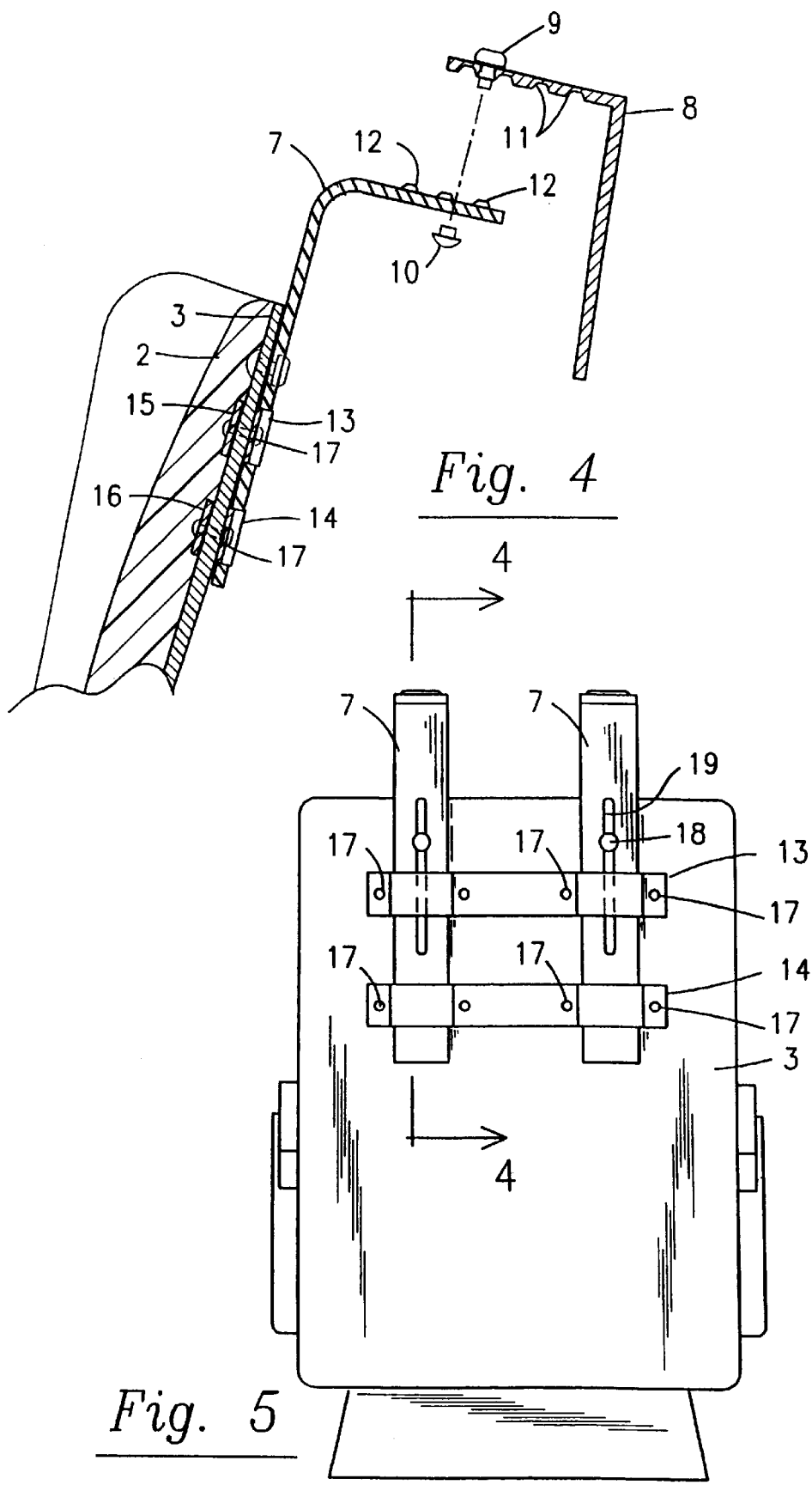

CHILD VEHICLE SAFETY SEAT

BACKGROUND OF THE INVENTION

1. Field of the Invention

The present invention relates to a child safety seat adapted to be securely mounted on an adult vehicle seat, and more particularly, to a child safety seat which can be mounted more securely on an adult vehicle seat than a conventional child vehicle safety seat, and to a kit with which a conventional child safety seat can be retrofitted for more secure mounting to a vehicle seat.

2. Description of the Related Art

The sudden stopping of a vehicle, such as during a frontal automobile collision, frequently results in injury or fatality if a passenger is not securely restrained. That is, if the rate of deceleration of the passenger is less than the rate of deceleration of an automobile cabin, the passenger continues traveling until he collides with, e.g., the vehicle windshield.

In order to restrain passengers in their seats, vehicles such as automobiles and airplanes are provided with passenger restraints such as lap belts and shoulder belts to restrain adult passengers in the seat and prevent undesired forward travel. These adult restraints are, however, completely unsuited for the restraining of infants or children.

Recently, vehicles have been designed with child safety seats built directly into the rear seat of the automobile. However, the preinstalled child seats are designed for only one size child, so that the seat may be too large for a small child or too small for a large child. Thus, at some point the owner of such a vehicle will have to install an after-market child seat. Further, all previous conventional vehicles have had no built-in child safety seats, and have required the vehicle operator to install a special child vehicle safety seat for the infant or child passenger. Given the wide variety of automobiles and adult seat constructions, the only common means for attachment of the child safety seat to the adult seat was by means of existing adult seat belts.

However, seat belts are not adapted for securely restraining a child vehicle safety seat on an adult vehicle seat. The seat cushion portion and the seatback portion of the adult vehicle seat are sprung and upholstered for the comfort of the adult passenger. No matter how tightly a child vehicle safety seat is fastened by means of a seat belt, the intense forces generated during a vehicle collision or sudden stop will merely cause the relative forward motion of the child safety seat to translate into compression of the seat springs as the child safety seat pivots forward about the pivot point dictated by the seat belt. The sudden return of the child safety seat from the forward sprung position to the rest position is a further hazard, causing whip-lash of the child. The forgoing presumes that the child safety seat is properly installed. However, due to the difficulty of properly installing a child safety seat, the child safety seat is frequently installed improperly or installed with slack, and in such cases the risk of harm is even greater.

A recent study by vehicle safety experts has shown that a large number of injuries and even deaths to children has resulted from either the improper securing of child vehicle safety seats in the vehicles, or the inability of the properly installed child safety seat to prevent whip-lash. There is thus a need for an improved means for securing a child vehicle safety seat in a vehicle.

A study of the child safety seat art shows that a large number of child safety seats have been proposed, but that few are capable of restraining forward motion of the seatback of the child safety seat.

U.S. Pat. No. 5,332,285 (Sinnhuber) teaches a child vehicle safety seat having a downwardly-pointing front portion for engaging with the main frame of the vehicle seat, and an upper rear portion for linking with the headrest which is supported on the backrest of the vehicle seat. Although the invention makes possible the secure mounting of the child vehicle safety seat on the vehicle seat, the secure mounting is only possible where the vehicle seat is manufactured with a special hook portion projecting from the main frame of the vehicle seat such that the child vehicle seat can be mated thereto. Further, this seat can not be used in automobiles which do not have a headrest with supports in the precise location for mating with the upper rear portion of the child safety seat for linking with the headrest. Accordingly, the child vehicle safety seat of Sinnhuber is not adapted for use with conventional vehicle seats which do not have these special mating portions.

U.S. Pat. No. 3,645,548 (Briner) teaches a child vehicle safety seat comprising a seat portion and a mounting frame portion, the frame being configured to be suspended or hung over the back of an auto seat, the seat portion being attached to the frame in a manner to allow relative movement between the seat and frame so that in the event of a collision the high deceleration forces of the seat can translate into forward moving forces, thus protecting the occupant from injury from impact. The child vehicle safety seat may also be laid down so that the child is in a prone position for sleeping. The seat is, however, disadvantageous in that the feature which allows for relative forward movement of the child seat with respect to the frame requires that the seat belt attachment to the child seat not restrain or incumber the sliding movement of the seat. It thus becomes impossible to securely fasten the child vehicle safety seat to the automobile vehicle seat by means of the seat belt. Further, the frame is specifically dimensioned for a particular vehicle seat and is not adjustable to securely fit a range of vehicle seats. Finally, the child vehicle safety seat of Briner has a completely different design from conventional child safety seats, and there is no suggestion of a means by which existing child vehicle safety seats can be retrofitted or remanufactured for improved safety.

U.S. Pat. No. 5,149,172 (Davis) teaches a vehicle safety seat including adjustable length strap means which may be used to vary the height of the seat part. A child safety harness is attached to the safety seats and straps and buckles are provided to secure parts of the seat to the chair seat and backrest. However, the securing of the child vehicle safety seat to the back rest portion of the vehicle seat with straps is not an effective means of securing the seat in view of the padding of the upholstery of the vehicle seat, the stretchability of straps, the give inherent in a buckle, and the fact that the forward movement of the vehicle seat during deceleration is perpendicular to the direction of securing of the straps.

While the above mentioned patents are representative of the designs which have been developed to provide child vehicle safety seats, each clearly has inherent problems, limitations and disadvantages. Accordingly, there remains a need for a means for securely and rigidly fastening a child vehicle safety seat to a vehicle seat such that forward motion of the backrest portion of the child vehicle safety seat is effectively arrested.

It is thus an object of the present invention to provide a child seat capable of being easily and quickly installed in an automobile.

It is a further object of the invention to provide a kit with which existing child vehicle safety seats can be modified for improved safety.

SUMMARY OF THE INVENTION

These and other objects of the invention are accomplished by a child vehicle safety seat including means for securely mounting the child vehicle safety seat to a vehicle seat, the child vehicle safety seat including a seat portion and a backrest portion, the vehicle seat including a seat portion and backrest portion, and the means for securely mounting the child safety seat to the vehicle seat including U-shaped bracket comprising a first arm and a second arm, wherein the first arm is bolted to the back of the backrest of the child vehicle safety seat, and wherein the second arm of the U-shaped bracket is adapted for mounting flush against the back of the vehicle backrest, such that the child vehicle safety seat is restrained by means of the bracket against forward movement upon sudden impact or sudden deceleration of the vehicle.

The invention further comprises a system and a kit for retro-fitting an existing child vehicle safety seat.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other child vehicle safety seats for carrying out the same purposes of the present invention. It should also be realized by those skilled in the art that such equivalent structures do not depart from the spirit and scope of the invention as set forth in the appended claims.

BRIEF DESCRIPTION OF THE DRAWING

For a fuller understanding of the nature and objects of the present invention reference should be made the following detailed description taken in with the accompanying drawings in which:

FIG. 4 is a detailed view showing the fastening of the mounting bracket to the seatback of the child vehicle safety seat; and FIG. 5 is a view of the back of the child safety seat showing the arrangement of the mounting brackets.

DETAILED DESCRIPTION OF THE INVENTION

Figure 1:
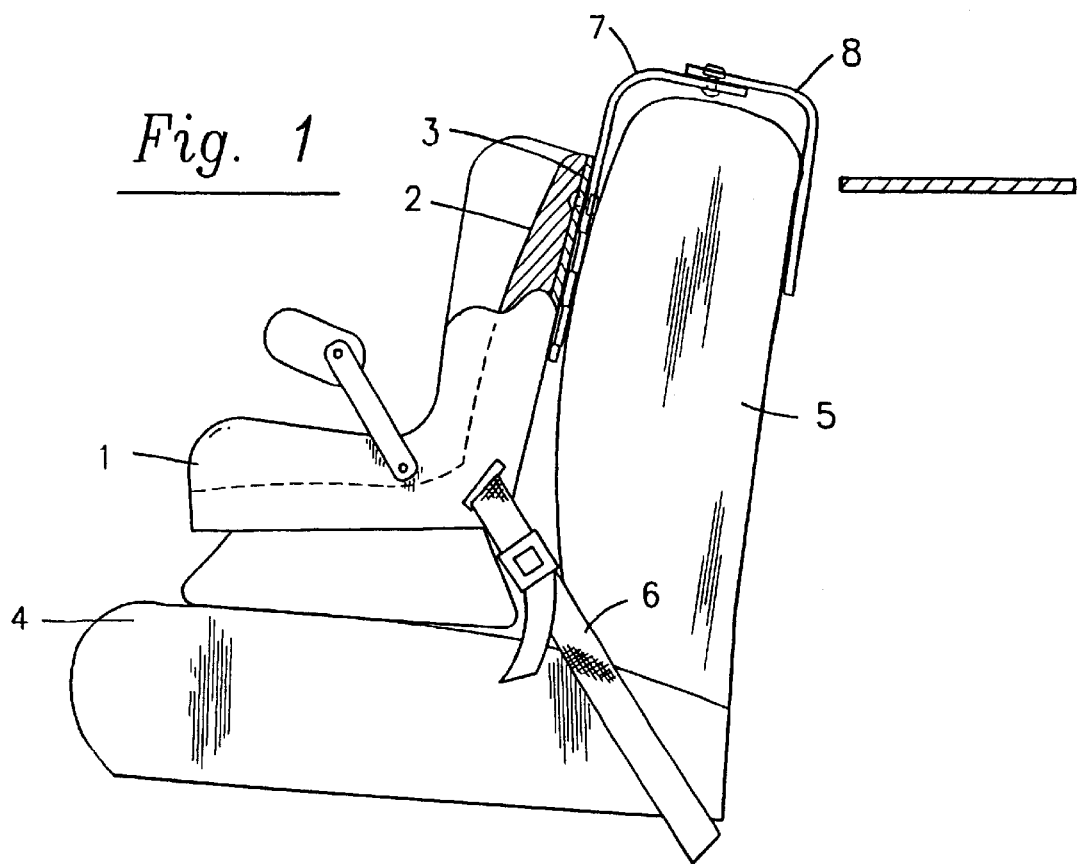
FIG. 1 shows a side elevation view of a child vehicle safety seat mounted on an automobile vehicle seat in accordance with the present invention.

The child vehicle safety seat according to the present invention was made after studying the design of conventional automobile vehicle seats, conventional child safety seats, and the physical relationship between the two during an accident.

The conventional automobile seat is comprised of a seat part and a seatback part. The seat part is comprised of a cushion part, which is comprised of a frame comprising side members and cross members. The side members of the cushion frame are connected to the mounting plates of a slide assembly by welding or bolting. The seat frame also includes provision to receive seat support elements such as springs. Typically such provision includes tabs projecting from the seat frame having holes to receive the spring ends. The seat frame structural elements also include a flange extending outwardly and then downwardly from the seat frame elements. This flange provides a means to which a seat cover can be attached and stretched across the seat. Such seat cover usually has attachment means such as hooks which can be affixed over the lower edge of the flange. This seat cushion part thus provides a resilient surface which is well adapted for the comfort of an adult passenger, but which is unsuited for securely holding a child safety seat, particularly in the case of an accident. That is, the cushion and springs permit the forward movement of the child seat to be translated into a downward pivoting of the child seat and a forward pivoting of the child seatback. Obviously, the further the child seat pivots forward during a collision, the stronger the stored torsional forces, and the stronger the return pivoting of the seatback and the chance of whiplash.

The adult vehicle seat further includes a seatback portion including a seatback frame, a recliner mechanism for reclining the seatback portion relative to the seat portion, and a passenger restraint system for retaining the passenger in the seat during sudden deceleration. The seatback frame is a fairly heavy reinforced structural assembly, as it must support seatback loads which occur during a vehicle collision. The vehicle seatback frame can usually be felt along the sides and top of the back of the seatback.

The present invention was made based upon the realization that the seatback of the child vehicle safety seat would be optimally secured if connected to the rigid seatback frame of the adult vehicle seat.

In a first embodiment of the present invention the child vehicle safety seat is manufactured with mounting brackets already installed, that is, with mounting brackets inserted in pre-formed receptacles for mounting brackets, so that the child vehicle safety seat is ready for immediate mounting on the vehicle seat. The invention is not limited to any particular design of the brackets or the receptacles, so long as the resulting structure has high rigidity.

An illustrative embodiment of a child vehicle safety seat according to the present invention, including a mounting bracket which may be retrofitted onto existing child safety seats, will now be described with reference to the figures.

FIG. 1 shows a child vehicle safety seat including a seat cushion part 1 and a seatback part including seatback padding 2 and a seatback rigid shell 3. The child safety seat is mounted on a vehicle seat including a seat cushion part 4 and a seatback part 5. The child safety seat is held on the vehicle seat by means of seatbelt 6.

Mounting hardware is provided to rigidly connect the seatback of the child safety seat to the edge of the back of the seatback of the vehicle seat, i.e., the region where the vehicle seatback frame is conventionally located. The mounting hardware may include a one-piece U-shaped bracket, but is preferably a two-piece bracket as shown in FIGS. 1 and 4.

The two-piece bracket comprises a first L-shaped member 7 and a second L-shaped member 8 connected to each other by at least one fastener such as male 9 and female 10 metal fasteners, thus forming a U-shaped bracket. The metal fasteners are preferably rounded so as not to have any sharp edges which may mar the automobile upholstery.

Figure 2:
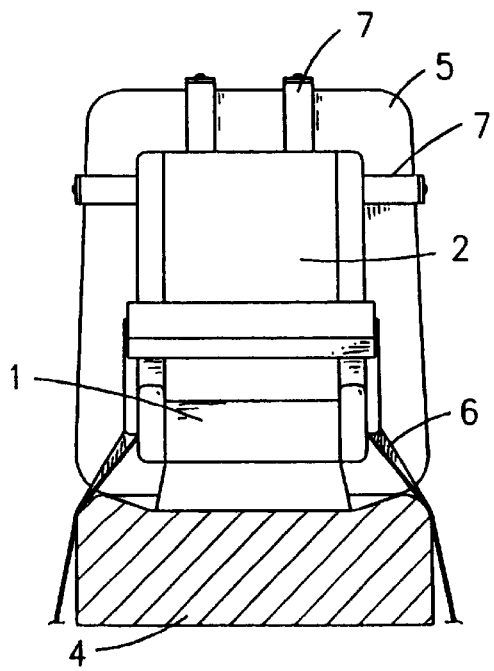
FIG. 2 is a front elevation view of the child vehicle safety seat mounted on a vehicle seat with two horizontal and two vertical mounting brackets.
Figure 3:
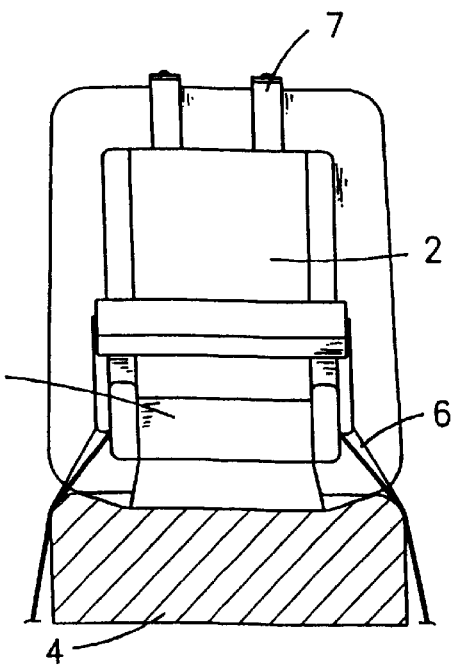
FIG. 3 shows the child vehicle safety seat according to FIG. 1 mounted on the vehicle seat by means of two vertical mounting brackets.

This U-shaped mounting bracket(s) can be mounted onto the back of a conventional child vehicle safety seat and thereby adapt the child vehicle safety seat to a particular vehicle seat. It is possible to use a single mounting bracket, or two vertical mounting brackets may be bolted to the back of the child safety seat for extending over the back of the vehicle seat as shown in FIG. 3, or two horizontal mounting brackets may be bolted to the back sides of the child safety seat for extending around the left and right sides of the vehicle seat. Where desired, the child vehicle safety seat may be mounted to the vehicle seat by means of two vertical and two horizontal mounting brackets, as shown in FIG. 2.

The bracket is preferably formed of flat metal, plastic, KEVLAR, or other substantially nonelastic and rigid material.

The region at which the two "L" shaped segments bolt together is so constructed that the distance between the arms of the U-shaped bracket can be varied and adapted to the dimensions (thickness) of the vehicle seatback. In the case that the bracket is comprised of two L-shaped segments, the region at which the L-shaped segments bolt together is preferably provided with matching recesses 11 and protrusions 12, such that the two bracket segments firmly engage with each other when bolted together. Any detente profile such as grooves, notches, protrusions, ratchets, etc. may be employed for variably engaging the bracket halves to insure against movement of the bracket segments relative to each even during the high forces of an impact.

Referring to FIGS. 4 and 5, upper receptacle bracket 13 and lower receptacle bracket 14 are positioned vertically on the back of child safety seat backrest part 3 opposite to corresponding upper brace 15 and lower brace 16 which are provided on the front of child safety seat backrest part 3. The front braces 15, 16 are merely provided as reinforcement to strengthen the connection between the U-shaped mounting bracket and child seat, in the case that it is considered that the child safety seat backrest part 3 may not be sufficiently strong by itself in the unreinforced condition, i.e., in the case that child safety seat backrest part 3 may break free of mounting bolts 17 in the case of an automobile accident.

The first arm 7 of the U-shaped bracket fits into slot-like openings between the upper and lower receptacle brackets 13, 14 and the child safety seat backrest part 3. The elevation of the first arm 7 may be adjusted to correspond to the upper surface of the vehicle seatback by means of adjusting bolt 18 and adjusting slot 19. That is, bolt 18 is not a load bearing element, and merely serves to hold first arm 7 in the proper elevational setting. To raise or lower first arm 7, it is merely necessary to loosen bolt 18 and to slide first arm 7 up or down within the slot-like openings between the upper and lower receptacle brackets 13, 14 and the child safety seat backrest part 3, with adjusting slot 19 providing for free movement of first arm 7. Tightening of bolt 18 arrests first arm 7 against up and down movement.

The U-shaped bracket can thus be adjusted to fit securely about the upper backrest portion of the vehicle seat, or around the sides of the vehicle seat, or both. In the case that the vehicle seat is the back seat of a conventional sedan-type vehicle, the second arm 8 of the U-shaped bracket is preferably made of a flat strip of metal capable of fitting in the crevice between the vehicle seatback and the horizontal platform between the seatback and the rear vehicle window, as shown in FIG. 1.

FIG. 2 shows a child vehicle safety seat securely mounted to the vehicle seat by means of vertical and horizontal mounting brackets. As is obvious from FIG. 2, the mounting brackets can be configured so as to avoid interference with headrests, and can be configured so as to conform to any of the various vehicle seat designs.

FIG. 3 shows the mounting of the child vehicle safety seat to the vehicle seat by means of two vertical mounting brackets. It will be readily understood that two horizontal mounting brackets could easily be substituted for the two vertical mounting brackets.

As is apparent from the above description and the accompanying figures, the use of bracket means attached to the backrest portion of the child vehicle safety seat prevents forward movement of the child vehicle safety seat during a sudden deceleration or collision, thus preventing the child vehicle safety seat from snapping forward and back and causing whiplash or neck injury to the child.

The further feature of the invention comprises a kit by means of which existing child vehicle safety seats can be modified or retrofitted in order to take advantage of the improved safety feature according to the present invention. That is, the invention may be in the form of a kit comprising a first strengthening member such as a metal bar or metal washer, brackets for fitting over the vehicle seat, and metal fasteners for fastening the bracket to the strengthening member through the child vehicle safety seat. That is, the child vehicle safety seat is normally comprised of a soft material such as plastic, and is not designed or engineered to withstand strong forces as may be imparted when using the bracket according to the present invention. That is, the mere bolting of a bracket to the backrest of the child vehicle safety seat will, in all likelihood, not be sufficient to restrain the child vehicle safety seat in the case of a sudden deceleration. Thus, at least washers, and preferably a metal bar, are provided as strengthening member(s) on the front side of the child vehicle safety seat backrest, receiving brackets are positioned flush over the back of the child vehicle safety seat opposite to the strengthening member(s), and metal fasteners such as bolts are used to fasten the bracket(s) to the strengthening member(s) through the child vehicle safety seat seatback.

The U-shaped brackets may be formed of tubular metal, flat strips of metal, plastic having a high hardness and high breaking strength, KEVLAR, etc. The bracket is preferably made of a polished metal or plastic coated metal so as not to scratch or abrade the vehicle upholstery.

The child vehicle safety seat is secured to the vehicle seat primarily by means of the vehicle safety belt, and secondarily by means of the mounting brackets as discussed above. Accordingly, the child vehicle safety seat can be securely restrained against forward movement in a case of a sudden deceleration or collision by bracket means which can be adapted to the shaped, configuration, thickness, of any vehicle seat.

Although the system was first designed as a child vehicle safety seat for use in automobiles, it will be readily apparent that the child vehicle safety seat is capable of other uses, such as a child airplane safety seats, etc. Although this invention has been described in its preferred form with a certain degree of particularity with respect to a child vehicle safety seat for use in an automobile, it is understood that the present disclosure of the preferred form has been made only by way of example and that numerous changes in the details of structures and the composition of the system may be resorted to without departing from the spirit and scope of the invention.

Now that the invention has been described,
What is claimed is:

1. A child vehicle safety seat including means for securely mounting the child vehicle safety seat to a vehicle seat having a seat cushion portion and a seatback portion with said seatback portion having a front surface, a back surface, and an edge profile, said child vehicle safety seat including a seat cushion portion and a backrest portion, and said means for mounting said child vehicle safety seat to said vehicle seat including at least one U-shaped bracket comprising a first arm and a second arm in the form of two L-shaped segments bolted together, wherein said first arm is attached to the backrest portion of said child vehicle safety seat, and wherein said U-shaped bracket is adapted for mounting about the edge profile of said vehicle seat such that the second arm of said U-shaped bracket is positioned flush against the back surface of said vehicle seatback portion, said U-shaped bracket is further mounted vertically on said child vehicle safety seat wherein said U-shaped bracket is vertically adjustable, wherein said backrest portion of said child vehicle safety seat is secured against forward movement upon sudden impact or sudden deceleration by means of said U-shaped bracket.

* * * * *